United States Patent
Zhang (10) Patent No.: US 12,474,800 B2
(45) Date of Patent: Nov. 18, 2025

(54) METHOD AND APPARATUS FOR DETERMINING POSITION OF TOUCH POINT, ELECTRONIC DEVICE AND NON-TRANSITORY COMPUTER-READABLE STORAGE MEDIUM

(71) Applicant: SHENZHEN HITEVISION TECHNOLOGY CO., LTD., Guangdong (CN)

(72) Inventor: Minghua Zhang, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/290,304

(22) PCT Filed: Jan. 10, 2022

(86) PCT No.: PCT/CN2022/070946
§ 371 (c)(1),
(2) Date: Nov. 13, 2023

(87) PCT Pub. No.: WO2023/103140
PCT Pub. Date: Jun. 15, 2023

(65) Prior Publication Data
US 2024/0248562 A1    Jul. 25, 2024

(30) Foreign Application Priority Data

Dec. 8, 2021   (CN) .......................... 202111493612.5

(51) Int. Cl.
*G06F 3/042*   (2006.01)
*G06F 3/041*   (2006.01)

(52) U.S. Cl.
CPC ........ *G06F 3/04166* (2019.05); *G06F 3/0421* (2013.01)

(58) Field of Classification Search
CPC ... G06F 3/04166; G06F 3/0421; G06F 3/0428
See application file for complete search history.

(56) References Cited

U.S. PATENT DOCUMENTS

| 2014/0028588 | A1 | 1/2014 | Neveu et al. |
| 2015/0234522 | A1* | 8/2015 | Zhang .................. G06F 3/0412 345/173 |
| 2024/0012508 | A1* | 1/2024 | Wu ....................... G06F 3/0428 |

FOREIGN PATENT DOCUMENTS

| CN | 101477429 A | 7/2009 |
| CN | 105760023 A | 7/2016 |

(Continued)

OTHER PUBLICATIONS

The International search report for PCT Application No. PCT/CN2022/070946, dated Aug. 29, 2022, 4 pages.

(Continued)

*Primary Examiner* — Xuemei Zheng
(74) *Attorney, Agent, or Firm* — East IP P.C.

(57) ABSTRACT

Embodiments of the present application provide a method and an apparatus for determining a position of a touch point. The method includes: determining, according to a scanning frame, a plurality of scanning infrared transmitting tubes; controlling a target scanning infrared transmitting tube to transmit an infrared signal, and controlling multiple groups of corresponding infrared receiving tubes to receive the infrared signal in sequence so as to obtain scanning data corresponding to the target scanning infrared transmitting tube; updating the target scanning infrared transmitting tube to be any one of scanning infrared transmitting tubes that have not been used for scanning, to repeatedly perform the step of controlling the target scanning infrared transmitting tube to transmit an infrared signal until obtaining scanning data corresponding to all scanning infrared transmitting tubes; and determining, according to the scanning data (Continued)

corresponding to all scanning infrared transmitting tubes, the position of the touch point.

13 Claims, 3 Drawing Sheets

(56) References Cited

FOREIGN PATENT DOCUMENTS

| CN | 105955553 | A | | 9/2016 | | |
|---|---|---|---|---|---|---|
| CN | 107943340 | A | * | 4/2018 | | G06F 3/041 |
| CN | 108536337 | A | | 9/2018 | | |
| CN | 105760023 | B | | 1/2019 | | |
| CN | 109597529 | A | * | 4/2019 | | G06F 3/042 |
| CN | 111078060 | A | * | 4/2020 | | G06F 3/0421 |
| CN | 111309189 | A | | 6/2020 | | |
| CN | 111324240 | A | | 6/2020 | | |
| CN | 112068739 | A | | 12/2020 | | |
| CN | 112462984 | A | | 3/2021 | | |
| CN | 112799547 | A | | 5/2021 | | |
| CN | 115543113 | A | * | 12/2022 | | G06F 3/041 |
| CN | 115617205 | A | * | 1/2023 | | G06F 3/042 |
| WO | 2010053305 | A2 | | 5/2010 | | |

OTHER PUBLICATIONS

The First Office Action for China Application No. 202111493612.5, dated May 9, 2024, 20 pages.

The extended European search report for EP Application No. 22902585.3, dated Aug. 21, 2024, 9 pages.

The Third Office Action for the CN application No. 202111493612.5, dated Apr. 29, 2025, 23 pages.

* cited by examiner

Fig. 4

METHOD AND APPARATUS FOR DETERMINING POSITION OF TOUCH POINT, ELECTRONIC DEVICE AND NON-TRANSITORY COMPUTER-READABLE STORAGE MEDIUM

CROSS-REFERENCE TO RELATED APPLICATION

The present application is a National Stage of International Application No. PCT/CN2022/070946, filed on Jan. 10, 2022, which claims priority to Chinese Patent Application No. 202111493612.5 filed on Dec. 8, 2021, and titled "METHOD AND APPARATUS FOR DETERMINING POSITION OF TOUCH POINT, AND ELECTRONIC DEVICE", which is incorporated herein by reference in its entirety.

TECHNICAL FIELD

Embodiments of the present application relate to the technical field of infrared touch control, and in particularly to a method and an apparatus for determining a position of a touch point, an electronic device and a non-transitory computer-readable storage medium.

BACKGROUND

In infrared touch control technology, sensing elements for transmitting and receiving an infrared ray are installed on the outer frame of a touch screen, and infrared matrices arranged densely along X and Y directions are used to detect and position touch control from a user. In a touch operation, any object used for touch control may change an infrared ray on a touching point to achieve an operation on the touch screen. The principle for implementing an infrared touch screen is similar to the principle for implementing surface acoustic wave touch control, and the sensing elements for transmitting and receiving the infrared ray is used by the infrared touch screen. These elements form an infrared detection net on the surface of a screen, an object used for the touch operation (such as a finger) may change the infrared ray of the touching point and then is converted into a coordinate of a position where the touch control is performed, thereby achieving the response to the operation.

The existing method for implementing an infrared touch control scanning includes: arranging infrared transmitting tubes and infrared receiving tubes on four sides of an infrared touch screen, respectively, lighting the transmitting tubes one by one, and collecting electrical signals of the infrared receiving tubes, so as to determine a blocked area. In this way, one complete data frame can be formed after all receiving tubes finish receiving and all transmitting tubes finish transmitting, thereby causing a low scanning frame rate. Since scanning one frame takes a relatively long time, and a scanning along one direction is required to be performed only after a scanning along the other direction is finished, under a condition that a touch point on the screen moves relatively fast (for example, under a condition that writing is performed on the infrared touch screen), when the scanning is performed from different directions, a deviation of a blocked position of the touch point is relatively large, causing a relatively serious blocking deviation phenomenon.

SUMMARY

In view of the above, embodiments of the present application provide a method and an apparatus for determining a position of a touch point, an electronic device and a non-transitory computer-readable storage medium.

In a first aspect, the embodiments of the present application provide a method for determining a position of a touch point, including: determining, according to a scanning frame, a plurality of scanning infrared transmitting tubes; controlling a target scanning infrared transmitting tube to transmit an infrared signal, and controlling multiple groups of corresponding infrared receiving tubes to receive the infrared signal in sequence so as to obtain scanning data corresponding to the target scanning infrared transmitting tube; updating the target scanning infrared transmitting tube to be any one of scanning infrared transmitting tubes that have not been used for scanning, to repeatedly perform the step of controlling the target scanning infrared transmitting tube to transmit an infrared signal until obtaining scanning data corresponding to all scanning infrared transmitting tubes; and determining, according to the scanning data corresponding to all scanning infrared transmitting tubes, the position of the touch point.

In a second aspect, the embodiments of the present application provide an apparatus for determining a position of a touch point, including: a first determination module in configured to determine, according to a scanning frame, a plurality of scanning infrared transmitting tubes; a first control module configured to control a target scanning infrared transmitting tube to transmit an infrared signal, and control multiple groups of corresponding infrared receiving tubes to receive the infrared signal in sequence so as to obtain scanning data corresponding to the target scanning infrared transmitting tube; a second control module configured to update the target scanning infrared transmitting tube to be any one of scanning infrared transmitting tubes that have not been used for scanning, to repeatedly perform the step of controlling the target scanning infrared transmitting tube to transmit an infrared signal until obtaining scanning data corresponding to all scanning infrared transmitting tubes; and a second determination module configured to determine, according to the scanning data corresponding to all scanning infrared transmitting tubes, the position of the touch point.

In a third aspect, the embodiments of the present application provide an electronic device including a memory, a processor, and a computer program stored on the memory and executable on the processor, wherein the computer program, when executed by the processor, implements the method for determining a position of a touch point as described in the first aspect.

In a fourth aspect, the embodiments of the present application provide a non-transitory computer-readable storage medium storing computer instructions, that are to cause a computer to perform the method for determining a position of a touch point as described in the first aspect.

BRIEF DESCRIPTION OF THE DRAWINGS

In order to more clearly illustrate embodiments of technical solutions in the present application or in the related art, the drawings required for describing the embodiments or the related art will be briefly described. Obviously, the drawings described below are only the embodiments of the present application. For a person of ordinary skill in the art, other drawings can also be obtained from these drawings without any inventive effort.

DETAILED DESCRIPTION

In order to make the objects, technical solutions and advantages of the present application clearer, the present application is further described in detail below with reference to the specific embodiments and the drawings.

It should be noted that, unless otherwise defined, technical or scientific terms used in the embodiments of the present application shall have the ordinary meaning as understood by one with ordinary skill in the art to which the present application belongs. Terms such as "first", "second" and the like used in the embodiments of the present application do not indicate any order, quantity, or importance, but are only used to distinguish different components. Terms such as "comprise" or "include" and the like mean that an element or item preceding the term encompasses an element or item listed after the term and equivalents thereof, but do not exclude other elements or items. Terms such as "connect" or "connected" and the like are not limited to physical or mechanical connections, and may include direct or indirect electrical connections. Terms such as "above", "under", "left", "right" and the like are used only to show a relative positional relationship, which may change accordingly after an absolute position of the described object changes.

As described in the background section, in infrared touch control technology, sensing elements for transmitting and receiving an infrared ray are installed on the outer frame of a touch screen, and infrared matrices arranged densely along X and Y directions are used to detect and position touch control from a user. In a touch operation, any object used for touch control may change an infrared ray on a touching point to achieve an operation on the touch screen. The principle for implementing an infrared touch screen is similar to the principle for implementing surface acoustic wave touch control, and the sensing elements for transmitting and receiving the infrared ray is used by the infrared touch screen. These elements form an infrared detection net on the surface of a screen, an object used for the touch operation (such as a finger) may change the infrared ray of the touching point and then is converted into a coordinate of a position where the touch control is performed, thereby achieving the response to the operation.

The existing method for implementing an infrared touch control scanning includes: arranging infrared transmitting tubes and infrared receiving tubes on four sides of an infrared touch screen, respectively, lighting the infrared transmitting tubes one by one, receiving infrared signals from the infrared transmitting tubes by the infrared receiving tubes one by one, and collecting electrical signals of the infrared transmitting tubes, so as to determine a blocked area. In this way, one complete data frame can be formed after all infrared receiving tubes finish receiving and all infrared transmitting tubes finish transmitting, thereby causing a low scanning frame rate.

Figure 1:
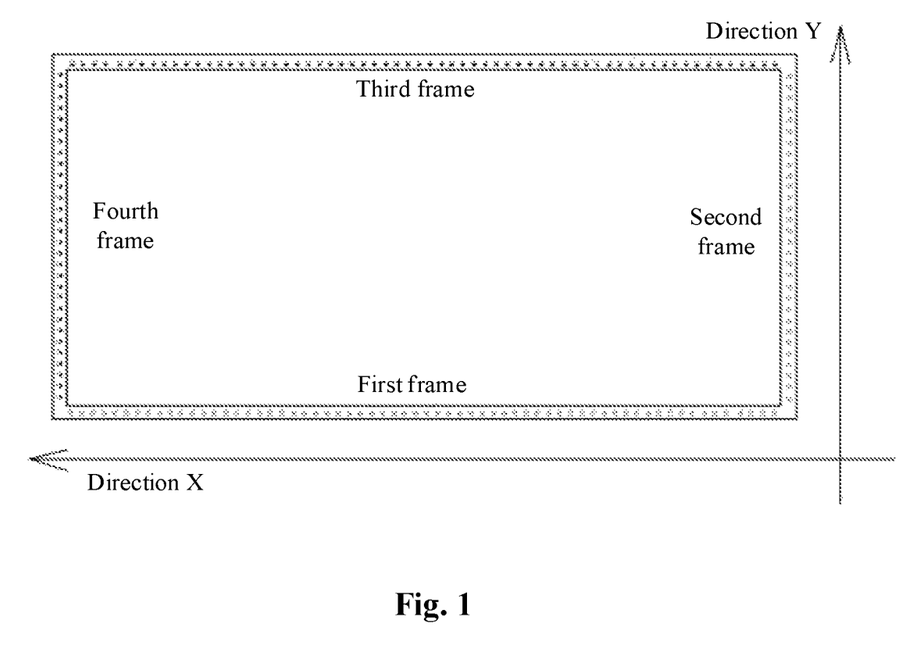
FIG. 1 shows an exemplary schematic structural view of an infrared touch screen.

FIG. 1 shows an exemplary schematic structural view of an infrared touch screen.

With reference to FIG. 1, a touch area in an infrared touch screen is generally surrounded by four frames. For example, a first frame and a third frame are arranged parallel to each other on two opposite sides of the touch area, and a second frame and a fourth frame are arranged parallel to each other on two opposite sides of the touch area.

For different scanning directions in the touch area, an infrared scanning is generally performed along two axes which may include a direction X and a direction Y. Herein, the first frame and the third frame may be arranged along the direction X, and the second frame and the fourth frame may be arranged along the direction Y. An infrared transmitting array and an infrared receiving array cooperating with each other to perform a scanning operation are arranged respectively on each two frames arranged oppositely. An example is given in which the scanning is performed along the direction Y, the infrared transmitting array may be arranged on the first frame, and the infrared receiving array may be arranged on the third frame. Herein, the infrared transmitting array may include a plurality of infrared transmitting tubes, and the infrared receiving array may include a plurality of infrared receiving tubes. All infrared transmitting tubes on the first frame are controlled to transmit an infrared signal, and after the infrared signal is received by all infrared receiving tubes arranged on the third frame, an infrared scanning performed on the touch area along the direction Y is completed. It may be understood that a plurality of infrared transmitting tubes and a plurality of infrared receiving tubes may be arranged respectively on the second frame and the fourth frame, all infrared transmitting tubes on the second frame are controlled to transmit an infrared signal, and after the infrared signal is received by all infrared receiving tubes arranged on the fourth frame, an infrared scanning performed on the touch area along the direction X may be completed.

However, the applicant has found through research that in the related art, after all infrared transmitting tubes and all infrared receiving tubes complete respectively a transmitting operation and a receiving operation, a scanning of one frame can be completed, and scanning data of a complete frame can be obtained, which takes a long time, thereby causing a relatively low scanning frame rate. However, completing the infrared scanning of one frame takes a long time, a scanning of two axes must be performed in sequence, and an operation for scanning the two axes respectively is impossible to be performed along the direction X and the direction Y at the same time, so that under a condition that a user writes fast or performs a touch operation on the touch screen, the deviation of the blocked position at the moment of scanning the two axes is relatively great, thereby easily causing a phenomenon that the blocking lines used for determining the position of the touch point on the two axes are not synchronized.

For this reason, the embodiments of the present application provide a method and an apparatus for determining a position of a touch point, an electronic device and a non-transitory computer-readable storage medium. Only a part of the infrared transmitting tubes are selected as the scanning infrared transmitting tubes, and the groups of infrared receiving tubes composed of the plurality of infrared receiving tubes are used to receive the infrared signal transmitted by the scanning infrared transmitting tubes, instead of receiving the infrared signal by individual infrared receiving tubes in sequence, so that the scanning time for each frame is reduced significantly and the scanning frame rate is improved. The scanning time for each frame is reduced, so that the scanning time for each axis in each frame is also reduced. Even if a writing speed on the screen is fast, the deviation of the blocked position at the moment of scanning two axes does not become great, so that scanning data formed by scanning the two axes for determining the position of the touch point can be synchronized, the deviation of the blocking lines on the two axes can be reduced, thereby greatly improving the writing effect.

The method for determining a position of a touch point according to the embodiments of the present application will be described in detail with reference to specific embodiments.

Figure 2:
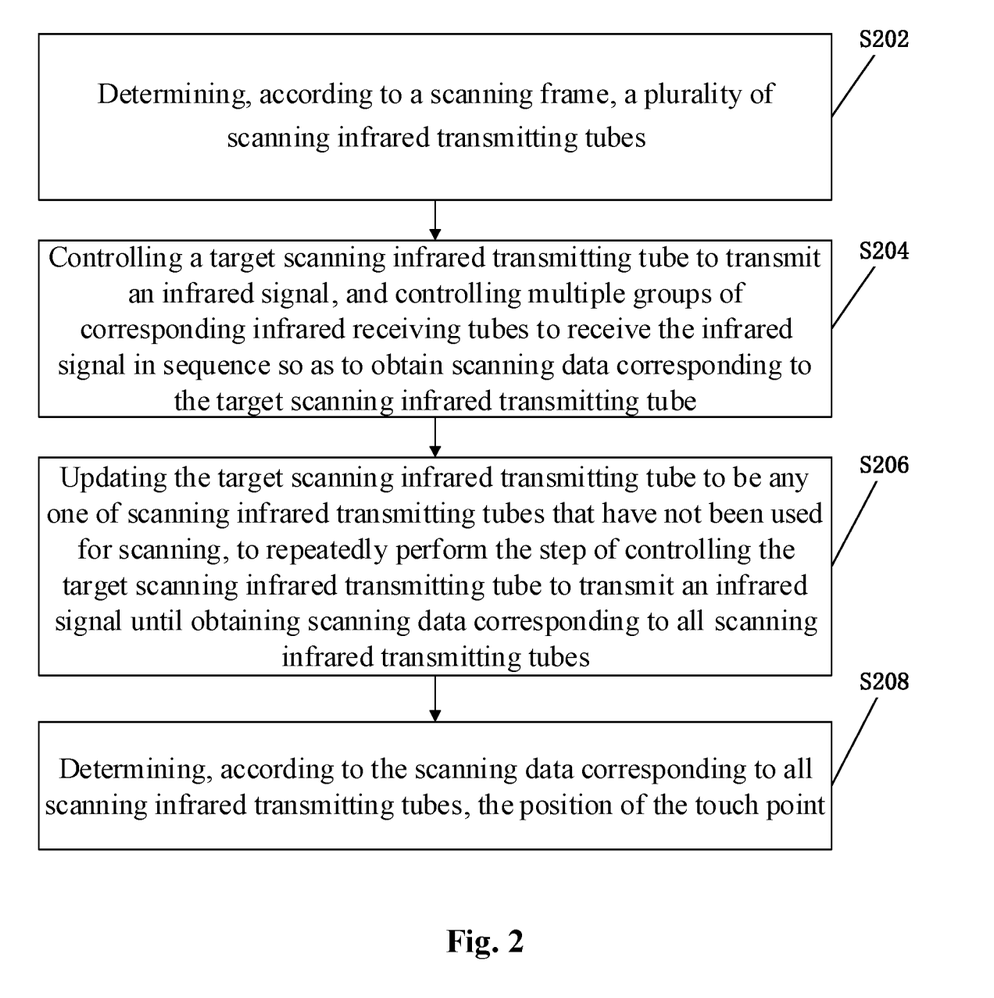
FIG. 2 shows an exemplary schematic flowchart of a method for determining a position of a touch point according to embodiments of the present application.

FIG. 2 shows an exemplary schematic flowchart of a method for determining a position of a touch point according to embodiments of the present application. As shown in FIG. 2, the method for determining a position of a touch point includes the following steps S202 to S208.

S202: determining, according to a scanning frame, a plurality of scanning infrared transmitting tubes.

S204: controlling a target scanning infrared transmitting tube to transmit an infrared signal, and controlling multiple groups of corresponding infrared receiving tubes to receive the infrared signal in sequence so as to obtain scanning data corresponding to the target scanning infrared transmitting tube.

S206: updating the target scanning infrared transmitting tube to be any one of scanning infrared transmitting tubes that have not been used for scanning, to repeatedly perform the step of controlling the target scanning infrared transmitting tube to transmit an infrared signal until obtaining scanning data corresponding to all scanning infrared transmitting tubes.

S208: determining, according to the scanning data corresponding to all scanning infrared transmitting tubes, the position of the touch point.

In some embodiments, one group of infrared receiving tubes may include one or more infrared receiving tubes, the number of infrared receiving tubes in each group of infrared receiving is at least partially the same.

For step S202, the scanning infrared transmitting tubes are a part of all infrared transmitting tubes arranged on the touch screen. Scanning all of the plurality of scanning infrared transmitting tubes once is one scanning frame. For a touch screen only provided with infrared transmitting tubes and infrared receiving tubes respectively on a group of opposite frames along a first direction, the scanning infrared transmitting tubes may include first scanning infrared transmitting tubes arranged along the first direction, and the first direction may be the direction X or the direction Y. For a touch screen that includes first infrared transmitting tubes arranged along the first direction and second infrared transmitting tubes arranged along a second direction, the scanning infrared transmitting tubes include a part of the first infrared transmitting tubes and a part of the second infrared transmitting tubes. Herein, under a condition that the first direction is the direction X, the second direction is the direction Y, and under a condition that the first direction is the direction Y, the second direction is the direction X.

Under a condition that the infrared transmitting tubes are determined according to the scanning frame, scanning infrared transmitting tubes corresponding to each scanning frame may be preset. For example, under a condition that a frame order of the scanning frame is an even number, a plurality of first infrared transmitting tubes with an even arranging order along the first direction are determined as the scanning infrared transmitting tubes, and a plurality of second infrared transmitting tubes with an even arranging order along the second direction are determined as the scanning infrared transmitting tubes. Under a condition that a frame order of the scanning frame is an odd number, a plurality of first infrared transmitting tubes with an odd arranging order along the first direction are determined as the scanning infrared transmitting tubes, and a plurality of second infrared transmitting tubes with an odd arranging order along the second direction are determined as the scanning infrared transmitting tubes.

In some other embodiments, those skilled in the art may also configure scanning infrared transmitting tubes corresponding to different scanning frames individually. For example, each scanning frame corresponds to first infrared transmitting tubes and second infrared transmitting tubes with a fixed order. Specifically, scanning infrared transmitting tubes corresponding to a first frame include first infrared transmitting tubes with an order of 1, 4, 6, 7 . . . along the first direction and second infrared transmitting tubes with an order of 1, 4, 6, 7 . . . along the second direction, and scanning infrared transmitting tubes corresponding to a second frame include first scanning infrared transmitting tubes with an order of 2, 3, 5, 8 . . . along the first direction and second infrared transmitting tubes with an order of 3, 5, 8, 9 . . . along the second direction. The embodiments of the present application are not limited to the manner in which the infrared transmitting tubes are determined according to the scanning frame.

In some embodiments, for a touch screen provided with first scanning infrared transmitting tubes arranged only along the first direction, in order to ensure that a scanning operation along the first direction can be completed quickly, a plurality of first infrared transmitting tubes arranged along the first direction may be selected as the first scanning infrared transmitting tubes according to a frame order of the scanning frame and a preset interval number, a remainder of a frame order n of a current scanning frame divided by a preset interval number M is calculated, and a plurality of first scanning infrared transmitting tubes are determined from all first infrared transmitting tubes arranged along the first direction according to the preset interval number and the remainder, and a plurality of scanning infrared transmitting tubes are determined according to the plurality of first scanning infrared transmitting tubes. Herein, after the remainder is obtained, a first infrared transmitting tube corresponding to the remainder may be directly determined as an initial first infrared transmitting tube, or some simple calculations (for example, a remainder+1 calculation) may also be performed on the remainder to obtain a calculation result, a first infrared transmitting tube corresponding to the calculation result is determined as the initial first infrared transmitting tube, and the plurality of first scanning infrared transmitting tubes are determined according to a plurality of first infrared transmitting tubes each having a distance of integer times the preset interval number from the initial first infrared transmitting tube. For example, the preset interval number is 4, and for the first scanning frame, the remainder obtained by calculation is 1, a first infrared transmitting tube with an order of 1 in all first infrared transmitting tubes may be directly determined as the initial first infrared transmitting tube, or a calculation (for example, a calculation like the remainder+1=2) may be performed on the remainder, and the second infrared transmitting tube are determined as the initial first infrared transmitting tube. A plurality of first infrared transmitting tubes each having a distance of 1 times the preset interval number, 2 times the preset interval number, 3 times the preset interval number and so on from the initial first infrared transmitting tube are determined so as to determine the plurality of first scanning infrared transmitting tubes. Of course, after the initial first infrared transmitting tube is obtained, a plurality of first infrared transmitting tubes each having a distance of even number times or odd number times the preset interval number from the initial first infrared transmitting tube may be determined as the first scanning infrared transmitting tubes, and the method for determining the first scanning infrared transmitting tubes is not limited in the embodiments of the present application.

In some embodiments, an arranging order of the initial first infrared transmitting tube in all first infrared transmitting tubes is same as the remainder. A plurality of first infrared transmitting tubes each having a distance of N times the preset interval number M from the initial first infrared transmitting tube are determined as the plurality of first scanning infrared transmitting tubes, wherein N is a positive integer. For different frame orders, the initial first infrared transmitting tube to be controlled is different, and based on frame orders increasing by order, the order of the initial first infrared transmitting tube may be changed in turn according to the change in the frame order. An example is given in which the preset interval number M is 4. In a scanning frame of the first frame, an initial first infrared transmitting tube is a first infrared transmitting tube, a plurality of first infrared transmitting tubes each having a distance of N times 4 from the initial first infrared transmitting tube are a fifth first infrared transmitting tube, a ninth first infrared transmitting tube and so on, respectively, so that the plurality of first scanning infrared transmitting tubes are obtained. In a scanning frame of a second frame, an initial first infrared transmitting tube is a second first infrared transmitting tube; in a scanning frame of a third frame, an initial first infrared transmitting tube is a third first infrared transmitting tube; in a scanning frame of a fourth frame, an initial first infrared transmitting tube is a fourth first infrared transmitting tube, and since under this condition the remainder is 0 and the preset interval number is M, a "0+4" first infrared transmitting tube should be selected under this condition, that is, an initial first infrared transmitting tube is the fourth first infrared transmitting tube; in a scanning frame of a fifth frame, an initial first infrared transmitting tube is the first infrared transmitting tube again, so that a first cycle is completed. In the above manner, the first infrared transmitting tubes corresponding to different scanning frames may be polled and scanned, thereby improving the lifespan of the first infrared transmitting tubes. Further, a plurality of scanning frames may be polled and scanned, so that under a condition that the accuracy for touch control requirement is high, the touch control position may be determined in combination with scanning data of the plurality of scanning frames polled in one period. For example, in the example, the touch control position may be determined in combination with scanning data of the first scanning frame to the fourth scanning frame, so that the touch control position may be calculated in a more reliable way.

In some embodiments, for a touch screen not only provided with infrared transmitting tubes and infrared receiving tubes respectively on one group of opposite frames along the first direction but also provided with infrared transmitting tubes and infrared receiving tubes respectively on one group of opposite frames along the second direction, a plurality of first scanning infrared transmitting tubes along the first direction and a plurality of second scanning infrared transmitting tubes along the second direction may be determined respectively according to the embodiments described above, and the plurality of scanning infrared transmitting tubes are determined according to all first scanning infrared transmitting tubes and all second scanning infrared transmitting tubes. Specifically, after the first scanning infrared transmitting tubes are determined, it may be determined according to the frame order n and the preset interval number M that, in the scanning frame, which one of the second scanning infrared transmitting tubes is a controlled initial second infrared transmitting tube, and an arranging order of the initial second infrared transmitting tube in all second infrared transmitting tubes is the same as the remainder of the frame order n of the scanning frame divided by the preset interval number M.

In some embodiments, a plurality of second infrared transmitting tubes each having a distance of N times the preset interval number M from the initial second infrared transmitting tube are determined, so that the plurality of second infrared transmitting tubes are determined as the plurality of second scanning infrared transmitting tubes, wherein N is a positive integer. For example, the preset interval number M is 4, the first infrared transmitting tube is determined firstly as an initial second infrared transmitting tube, a fifth second infrared transmitting tube is determined as one of the second scanning infrared transmitting tubes at a position which has a distance of 4 second infrared transmitting tubes from the initial second infrared transmitting tube, a ninth second infrared transmitting tube is determined as one of the second scanning infrared transmitting tubes at a position which has a distance of 2 times the preset interval number M from the initial second infrared transmitting tube (that is, at a position which has a distance of 8 second infrared transmitting tubes from the initial second infrared transmitting tube), and the remaining second scanning infrared transmitting tubes are determined in sequence in this way.

For step S204, the determined target scanning infrared transmitting tube is controlled to transmit the infrared signal, and the multiple groups of corresponding infrared receiving tubes are controlled to receive the infrared signal in sequence, so that the scanning data corresponding to the target scanning infrared transmitting tube is obtained.

In some embodiments, under a condition that a scanning is performed along either direction, an example is given in which a scanning is performed only along the direction Y. A grouping is performed on any adjacent infrared receiving tubes on the third frame to obtain multiple groups of infrared receiving tubes, an initial first infrared transmitting tube on the first frame is controlled to transmit an infrared signal, and the multiple groups of corresponding infrared receiving tubes are controlled to receive the infrared signal in sequence, wherein the multiple groups of corresponding infrared receiving tubes are arranged on the third frame for receiving an infrared signal transmitted by the target scanning infrared transmitting tube on the first frame. For example, each group of infrared receiving tubes is controlled in order to receive the infrared signal according to a target scanning order. After the infrared signal is received by a first group of infrared receiving tubes, scanning data corresponding to the first group of infrared receiving tubes is obtained, then the first group of infrared receiving tubes is turned off, and a second group of infrared receiving tubes is turned on, so that the infrared signal is received by the second group of infrared receiving tubes, and scanning data corresponding to the second group of infrared receiving tubes is obtained, and so on, until the infrared signal is received by all groups of infrared receiving tubes and scanning data corresponding to all groups of infrared receiving tubes are obtained.

In some embodiments, a manner of selecting a random number may also be used to randomly control any group of corresponding infrared receiving tubes to receive the infrared signal. For example, the multiple groups of corresponding infrared receiving tubes may be multiple groups of infrared receiving tubes arranged on the third frame for scanning along the direction Y or multiple groups of infrared receiving tubes arranged on the fourth frame for scanning along the direction X. Then after scanning data corresponding thereto is obtained, any group of infrared receiving tubes among groups of infrared receiving tubes that have not been controlled is controlled randomly to receive the infrared signal, and scanning data corresponding to the any group of infrared receiving tubes is obtained, and so on, until the infrared signal is received by all groups of infrared receiving tubes and scanning data corresponding to all groups of infrared receiving tubes are obtained.

For step S206, after the infrared signal transmitted by the initial first infrared transmitting tube is received by all groups of infrared receiving tubes and the corresponding scanning data is obtained, the initial first infrared transmitting tube is turned off, and any one of first scanning infrared transmitting tubes that have not been used for scanning may be controlled in order or in a random manner to transmit the infrared signal, and all groups of infrared receiving tubes are controlled in order or in a random manner to receive the infrared signal in sequence and the corresponding scanning data are obtained, until infrared signals transmitted by all target scanning infrared transmitting tubes are received by all groups of infrared receiving tubes and all corresponding scanning data are obtained, that is, a scanning of one of frames along the direction Y is completed.

In some embodiments, one group of infrared receiving tubes may be controlled in order or in a random manner to be in a receiving state, and each target scanning infrared transmitting tube is controlled in order or in a random manner to transmit the infrared signal in sequence, until the group of infrared receiving tubes receives in sequence the infrared signals transmitted by all target scanning infrared transmitting tubes and corresponding scanning data are obtained. Next, one of the groups of infrared receiving tubes that have not been controlled may be continuously controlled in order or in a random manner to be in a receiving state, and each target scanning infrared transmitting tube is controlled in order or in a random manner to transmit the infrared signals in sequence, until the infrared signals transmitted by all target scanning infrared transmitting tubes are received by the group of infrared receiving tubes in sequence and corresponding scanning data is obtained, and so on, until the infrared signals transmitted by all target scanning infrared transmitting tubes are received by all groups of infrared receiving tubes and all corresponding scanning data are obtained, that is, the scanning of one of the frames along the direction Y is completed.

It may be understood that under a condition that the scanning is required to be performed along both the direction X and the direction Y, a scanning of a current frame along both directions may be completed in turn, so that all scanning data of the current frame is obtained.

For example, one group of infrared receiving tubes arranged along the direction X is controlled in order or in a random manner to be in a receiving state, and each target scanning infrared transmitting tube arranged along the direction X is controlled in order or in a random manner to transmit the infrared signal, until the infrared signals transmitted by all target scanning infrared transmitting tubes are received by the group of infrared receiving tubes in sequence and corresponding scanning data is obtained. Next, one of groups of infrared receiving tubes arranged along the direction X that have not been controlled may be continuously controlled in order or in a random manner to be in a receiving state, and each target scanning infrared transmitting tube arranged along the direction X is controlled in order or in a random manner to transmit the infrared signal in sequence, until the infrared signals transmitted by all target scanning infrared transmitting tubes are received by the group of infrared receiving tubes in sequence and corresponding scanning data is obtained, and so on, until the infrared signals transmitted by all target scanning infrared transmitting tubes are received by all groups of infrared receiving tubes and all corresponding scanning data are obtained, that is, a scanning of a current frame along the direction Y is completed.

It may be understood that after the scanning of the current frame along the direction Y is completed, one group of infrared receiving tubes arranged along the direction Y may be controlled in order or in a random manner to be in a receiving state, and each target scanning infrared transmitting tube arranged along the direction Y is controlled in order or in a random manner to transmit the infrared signal, until the infrared signals transmitted by all target scanning infrared transmitting tubes are received by the group of infrared receiving tubes in sequence and corresponding scanning data is obtained. Next, one of groups of infrared receiving tubes arranged along the direction Y that have not been controlled may be continuously controlled in order or in a random manner to be in a receiving state, and each target scanning infrared transmitting tube arranged along the direction Y is controlled in order or in a random manner to transmit the infrared signal in sequence, until the infrared signals transmitted by all target scanning infrared transmitting tubes are received by the group of infrared receiving tubes in sequence and corresponding scanning data is obtained, and so on, until the infrared signals transmitted by all target scanning infrared transmitting tubes are received by all groups of infrared receiving tubes and all corresponding scanning data are obtained, that is, a scanning of a current frame along the direction X is completed. Thus, the scanning the current frame along the direction X and the direction Y is completed, thereby obtaining all scanning data of the current frame.

It should be noted that, under a condition that the scanning is either performed along a single direction or along both of the direction X and the direction Y, and a scanning of a next frame is performed, an initial infrared transmitting tube changes according to the remainder of the frame order n of the scanning frame divided by the preset interval number M, so as to ensure that each infrared transmitting tube can be used under a condition that a scanning of a plurality of frames is performed, and data deviation and excessive loss of a device occurring under a condition that the scanning data is determined by a plurality of fixed infrared transmitting tubes are avoided.

For step S208, the position of the touch point may be determined according to the scanning data corresponding to all scanning infrared transmitting tubes.

In some embodiments, the first scanning data is obtained according to the scanning data of all first scanning infrared transmitting tubes, the second scanning data is obtained according to the scanning data of all second scanning infrared transmitting tubes, and the position of the touch point is determined according to the first scanning data and the second scanning data.

In some embodiments, the position of the touch point may be determined according to a blocking condition between the groups of infrared receiving tubes and the scanning infrared transmitting tubes. Specifically, whether there is a blocking between the groups of infrared receiving tubes and the scanning infrared transmitting tubes may be determined according to the scanning data; in response to detecting that there is a blocking between the groups of infrared receiving tubes and the scanning infrared transmitting tubes, a plurality of blocking lines may be determined according to a physical connection line between each group of infrared receiving tubes and each scanning infrared transmitting tube where there is a blocking; a collection of blocking lines is determined according to the plurality of blocking lines; and the position of the touch point is determined according to the collection of blocking lines.

For determining, according to the scanning data, whether there is a blocking between the groups of infrared receiving tubes and the scanning infrared transmitting tubes, all scanning data may be converted into signal strength data, the signal strength data may be compared with a preset signal strength threshold so as to determine whether the signal strength data is less than the preset signal strength threshold, and under a condition that the signal strength data is detected to be less than the preset signal strength threshold, it may be determined that there is a blocking between the groups of infrared receiving tubes corresponding to the signal strength data and the scanning infrared transmitting tubes corresponding to the signal strength data.

It should be noted that in response to the frame order n of the current scanning frame being not less than the preset interval number M, a collection of all blocking lines corresponding to the current scanning frame and M previous scanning frames adjacent to the current scanning frame is determined, so as to determine the position of the touch point according to an area where all blocking lines in the collection of all blocking lines intersect. Specifically, under a condition that the collection of blocking lines is greater than or equal to the preset interval number M, that is, under a condition that the frame order n is greater than or equal to the preset interval number M, a collection of blocking lines used for calculation is a combination of An, A (n−1). A (n−M+1), for example, under a condition that n=6, a combination of A6, A5, A4 and A3 is used for calculation.

It may be seen from the above that the embodiments of the present application provide a method for determining a position of a touch point, so that the plurality of scanning infrared transmitting tubes are determined according to the scanning frame, the target scanning infrared transmitting tube is determined and controlled to transmit the infrared signal, and the multiple groups of corresponding infrared receiving tubes are controlled to receive the infrared signal in sequence so as to obtain the scanning data corresponding to the target scanning infrared transmitting tube; the target scanning infrared transmitting tube is updated to be any one of the scanning infrared transmitting tubes that have not been used for scanning, to repeatedly perform the step of controlling the target scanning infrared transmitting tube to transmit the infrared signal until scanning data corresponding to all scanning infrared transmitting tubes are obtained, thereby determining the position of the touch point according to the scanning data corresponding to all scanning infrared transmitting tubes. Only a part of the scanning infrared transmitting tubes are selected as the target scanning infrared transmitting tubes, so that the scanning time for each frame is reduced significantly and the scanning frame rate is improved. The scanning time for each frame is reduced, so that the scanning time for each axis in each frame is also reduced. Even if a writing speed on the screen is fast, the deviation of the blocked position at the moment of scanning two axes does not become great, so that scanning data formed by scanning the two axes for determining the position of the touch point can be synchronized, and the deviation of the blocking lines on the two axes can be reduced, thereby greatly improving the writing effect.

It should be noted that the method according to the embodiments of the present application may be implemented by a single device, such as a computer or a server. The method of the embodiments may further be applied to a distributed scenario and accomplished by a cooperation of a plurality of devices. In such a distributed scenario, one of the plurality of devices may only implement one or more steps of the method according to the embodiments of the present application, and the plurality of devices may interact with each other to complete the method.

It should be noted that some embodiments of the present application are described above. Other embodiments are within the scope of the appended claims. Under some conditions, acts or steps recited in the claims may be implemented in an order different from that in the embodiments and can still achieve desired results. In addition, the processes depicted in the drawings do not necessarily require the particular order or sequential order as shown to achieve the desired results. Multi-tasking processing and parallel processing are also possible or may be beneficial in some implementations.

Based on the same inventive concept, and corresponding to the method of any one of the embodiments described above, the present application further provides an apparatus for determining a position of a touch point.

Figure 3:
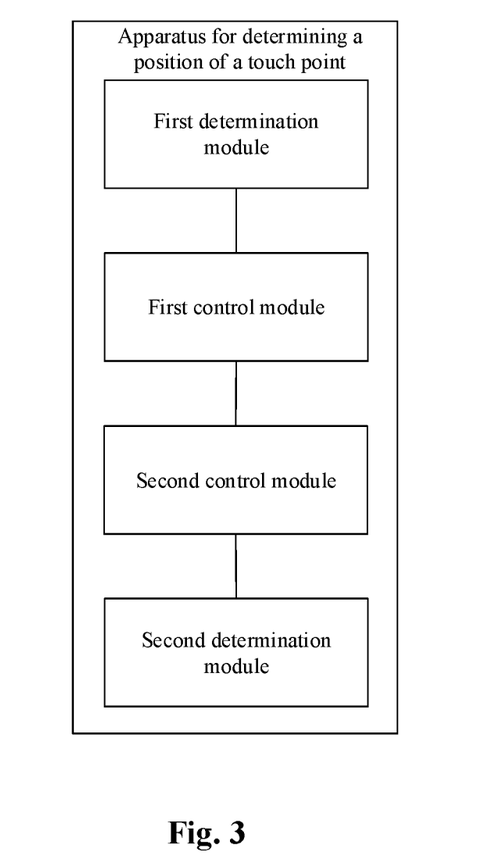
FIG. 3 shows an exemplary schematic structural view of an apparatus for determining a position of a touch point according to embodiments of the present application.

With reference to FIG. 3, the apparatus for determining a position of a touch point includes: a first determination module, a first control module, a second control module and a second determination module; wherein the first determination module is configured to determine, according to a scanning frame, a plurality of scanning infrared transmitting tubes; the first control module is configured to control a target scanning infrared transmitting tube to transmit an infrared signal, and control multiple groups of corresponding infrared receiving tubes to receive the infrared signal in sequence so as to obtain scanning data corresponding to the target scanning infrared transmitting tube; the second control module is configured to update the target scanning infrared transmitting tube to be any one of scanning infrared transmitting tubes that have not been used for scanning, to repeatedly perform the step of controlling the target scanning infrared transmitting tube to transmit an infrared signal until obtaining scanning data corresponding to all scanning infrared transmitting tubes; and the second determination module is configured to determine, according to the scanning data corresponding to all scanning infrared transmitting tubes, the position of the touch point.

In some possible implementations, the scanning infrared transmitting tubes include first scanning infrared transmitting tubes arranged along a first direction; the first determination module is further configured to: calculate a reminder of a frame order of the scanning frame divided by a preset interval number; determine, according to the preset interval number and the remainder, a plurality of first scanning infrared transmitting tubes from all first infrared transmitting tubes arranged along the first direction; and determine, according to the plurality of first scanning infrared transmitting tubes, the plurality of scanning infrared transmitting tubes.

In some possible implementations, the first determination module is further configured to: determine, according to the remainder, an initial first infrared transmitting tube, wherein an arranging order of the initial first infrared transmitting tube in all first infrared transmitting tubes is same as the remainder; and determine a plurality of first infrared transmitting tubes each having a distance of N times the preset interval number from the initial first infrared transmitting tube so as to obtain the plurality of first scanning infrared transmitting tubes, wherein N is a positive integer.

In some possible implementations, the scanning infrared transmitting tubes further include second scanning infrared transmitting tubes arranged along a second direction; and the first determination module is further configured to: determine, according to the preset interval number and the remainder, a plurality of second scanning infrared transmitting tubes from all second infrared transmitting tubes arranged along the second direction; and determine, according to the first scanning infrared transmitting tubes and the second scanning infrared transmitting tubes, the plurality of scanning infrared transmitting tubes.

In some possible implementations, the first determination module is further configured to: determine, according to the remainder, an initial second infrared transmitting tube, wherein an arranging order of the initial second infrared transmitting tube in all second infrared transmitting tubes is same as the remainder; and determine a plurality of second infrared transmitting tubes each having a distance of N times the preset interval number from the initial second infrared transmitting tube so as to obtain the plurality of second scanning infrared transmitting tubes, wherein N is a positive integer.

In some possible implementations, the second determination module is further configured to: obtain, according to scanning data of the plurality of first scanning infrared transmitting tubes, first scanning data; obtain, according to scanning data of the plurality of second scanning infrared transmitting tubes, second scanning data; and determine, according to the first scanning data and the second scanning data, the position of the touch point.

In some possible implementations, the second determination module is further configured to: determine, according to the scanning data, whether there is a blocking between the groups of infrared receiving tubes and the scanning infrared transmitting tubes; in response to detecting that there is a blocking between the groups of infrared receiving tubes and the scanning infrared transmitting tubes, determine a plurality of blocking lines according to a physical connection line between each group of infrared receiving tubes and each scanning infrared transmitting tube where there is a blocking; determine, according to the plurality of blocking lines, a collection of blocking lines; and determine, according to the collection of blocking lines, the position of the touch point.

In some possible implementations, the second determination module is further configured to: convert the scanning data into signal strength data; compare the signal strength data with a preset signal strength threshold so as to determine whether the signal strength data is less than the preset signal strength threshold; and in response to detecting that the signal strength data is less than the preset signal strength threshold, determine that there is a blocking between the groups of infrared receiving tubes and the scanning infrared transmitting tubes corresponding to the signal strength data.

In some possible implementations, the number of infrared receiving tubes in each of the multiple groups of infrared receiving tubes is at least partially the same.

For convenience of description, the apparatus is divided into various modules according to functions to describe them respectively. Of course, the functions of the various modules may be implemented in one or more software and/or hardware when the embodiments of the present application are implemented.

The apparatus according to the embodiments is used to implement the method for determining a position of a corresponding touch point described in any one of the foregoing embodiments, and has the beneficial effects of corresponding embodiments of the method, which is not repeated herein.

Figure 4:
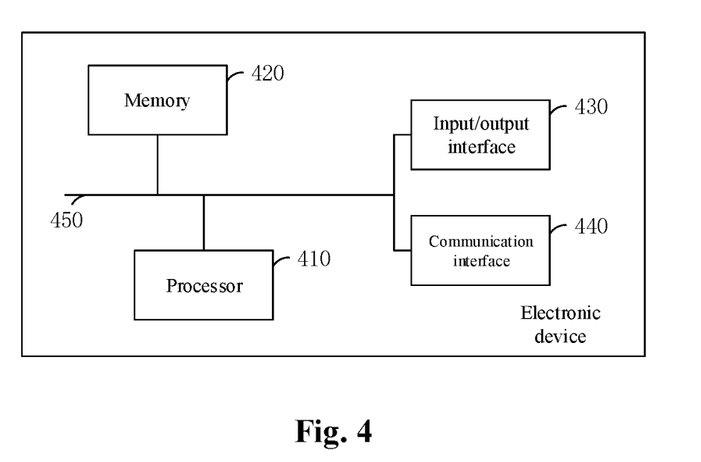
FIG. 4 shows an exemplary schematic structural view of an electronic device according to embodiments of the present application.

Based on the same inventive concept, and corresponding to the method according to any one of the embodiments, the present application further provides an electronic device including a memory, a processor and a computer program stored on the memory and executable on the processor, wherein the computer program, when executed by the processor, implements the method for determining a position of a touch point described in any one of the embodiments. FIG. 4 shows an exemplary schematic structural view of hardware of the electronic device according to the embodiment, and the electronic device may include a processor 410, a memory 420, an input/output interface 430, a communication interface 440 and a bus 450. Herein, the processor 410, the memory 420, the input/output interface 430 and the communication interface 440 are communicatively connected to each other in the device via the bus 450.

The processor 410 may be implemented by a general-purpose central processing unit (CPU), a microprocessor, an application specific integrated circuit (ASIC), or one or more integrated circuits and the like, and may be configured to execute relevant programs to implement the technical solutions according to the embodiments of the present application.

The memory 420 may be implemented in a form of a read only memory (ROM), a random access memory (RAM), a static storage device, a dynamic storage device and the like. The memory 420 may store an operating system and other application programs, and when the technical solutions according to the embodiments of the present application are implemented by software or firmware, relevant program codes are stored in the memory 420 and are called and executed by the processor 410. Thus, the memory 420 generally includes one or more tangible (non-transitory) computer-readable storage media (for example, memory devices) encoded with software including computer-executable instructions that when executed (for example, by one or more processors), are operable to perform the operations described with reference to the methods according to any one of the aspects of the present application.

The input/output interface 430 is configured to connect input/output modules to achieve input and output of information. The input/output modules may be provided as components in the device (not shown in the drawings) or may be externally connected to the device to provide corresponding functions. Herein, an input device may include a keyboard, a mouse, a touch screen, a microphone, various sensors and the like, and an output device may include a display, a speaker, a vibrator, an indicator light and the like.

The communication interface 440 is configured to connect communication modules (not shown in the drawings) to achieve communicative interaction between the device and other devices. Herein, the communication modules may achieve wire communication (such as via USB, a network cable and the like) or wireless communication (such as via a mobile network, WIFI, bluetooth and the like).

The bus 950 includes a path for communicating information among the various components of the device, such as the processor 910, the memory 920, the input/output interface 930, and the communication interface 940.

In an example, the electronic device may be a mobile phone, a tablet computer, a notebook computer, a palm computer, a vehicle-mounted electronic device, an ultra-mobile personal computer (UMPC), a netbook, a personal digital assistant (PDA), and the like.

It should be noted that although only the processor 410, the memory 420, the input/output interface 430, the communication interface 440 and the bus 450 are shown for the device described above, in specific implementations, the device may further include other components necessary for its normal operation. Moreover, those skilled in the art may appreciate that the device described above may include only the components that are necessary to implement the solutions of the embodiments of the present application, and may not necessarily include all of the components shown in the drawings.

The electronic device according to the embodiments is used to implement the method for determining a position of a corresponding touch point described in any one of the foregoing embodiments, and has the beneficial effects of corresponding embodiments of the method, which is not repeated herein.

Based on the same inventive concept, and corresponding to the method according to any one of the embodiments, the embodiments of the present application further provide a non-transitory computer-readable storage medium storing computer instructions, and the computer instructions are used to cause the computer to execute the method for determining a position of a touch point described in any one of the embodiments.

The computer-readable medium according to the embodiments may include a permanent/non-permanent medium, or a removable/non-removable medium, which may achieve storage of information by any method or technology. The information may be computer readable instructions, data structures, modules of a program, or other data. Examples of the computer storage medium include, but are not limited to: phase random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic cassettes, magnetic tape magnetic disk storage or other magnetic storage devices, or any other non-transmission medium which may be used to store information accessible to a computing device.

The computer instructions stored on the storage medium of the embodiments are used to cause the computer to execute the method for determining a position of a touch point described in any one of the embodiments, and have the beneficial effects of the corresponding embodiments of the method, which is not repeated herein.

A person of ordinary skill in the art should appreciate that the discussion of any of the above embodiments is only exemplary, and is not intended to imply that the scope of the present application (including the claims) is limited to these examples. Under the concept of the present application, technological features of the above embodiments or different embodiments may be combined, the steps may be implemented in any order, and there are many other variations of different aspects of the embodiments of the present application described above, which are not described in detail for clarity.

In addition, in order to simplify the illustration and discussion and not to obscure the embodiments of the present application, well-known power/ground connections of integrated circuit (IC) chips and other components may or may not be shown in the provided drawings. In addition, the apparatuses may be shown in a form of block diagram to avoid obscuring the embodiments of the present application, and the following fact is also considered: details concerning implementations of these apparatuses in the block diagrams are highly dependent upon a platform on which the embodiments of the present application are implemented (that is, these details should be completely within the knowledge of one skilled in the art). Under a condition that specific details (such as circuits) are set forth to describe exemplary embodiments of the present application, it will be apparent to one skilled in the art that the embodiments of the present application may be implemented without these specific details or with variations of these specific details. Therefore, these descriptions are considered to be illustrative but not restrictive.

Although the present application has been described in conjunction with the specific embodiments of the present application, many alternatives, modifications, and variations of these embodiments will be apparent to one skilled in the art in light of the foregoing description. For example, other memory architectures (such as dynamic RAM (DRAM)) may use the discussed embodiments.

The embodiments of the present application are intended to encompass all such alternatives, modifications and variations falling within the broad scope of the appended claims. Therefore, any omission, modification, equivalent alternative, and improvement that are made within the spirit and principle of the embodiments of the present application should be encompassed within the protection scope of the present application.

What is claimed is:

1. A method for determining a position of a touch point, comprising:
    determining, according to a scanning frame of a plurality of scanning frames, a plurality of scanning infrared transmitting tubes, wherein a part of all infrared transmitting tubes arranged on a touch screen are selected as the plurality of scanning infrared transmitting tubes to transmit;
    controlling, in the scanning frame, a target scanning infrared transmitting tube of the plurality of scanning infrared transmitting tubes to transmit an infrared signal, and controlling multiple groups of corresponding infrared receiving tubes to receive the infrared signal in sequence so as to obtain scanning data corresponding to the target scanning infrared transmitting tube;
    updating the target scanning infrared transmitting tube to be any one of scanning infrared transmitting tubes of the plurality of scanning infrared transmitting tubes that have not been used for scanning, to repeatedly perform the step of controlling, in the scanning frame, the target scanning infrared transmitting tube to transmit an infrared signal until obtaining scanning data corresponding to the plurality of scanning infrared transmitting tubes in the scanning frame; and
    determining, according to the scanning data corresponding to the plurality of scanning infrared transmitting tubes in the scanning frame, the position of the touch point,
    wherein the plurality of scanning infrared transmitting tubes comprise first scanning infrared transmitting tubes arranged along a first direction;

the determining, according to the scanning frame, the plurality of scanning infrared transmitting tubes further comprises:
determining, according to a preset interval number and a remainder of a frame order of the scanning frame divided by the preset interval number, a plurality of first scanning infrared transmitting tubes from all first infrared transmitting tubes arranged along the first direction;
wherein the plurality of scanning infrared transmitting tubes further comprise second scanning infrared transmitting tubes arranged along a second direction; and
the method further comprises:
determining, according to the preset interval number and the remainder, a plurality of second scanning infrared transmitting tubes from all second infrared transmitting tubes arranged along the second direction; and
determining, according to the first scanning infrared transmitting tubes and the second scanning infrared transmitting tubes, the plurality of scanning infrared transmitting tubes.

2. The method according to claim 1, wherein the determining, according to the preset interval number and the remainder, the plurality of first scanning infrared transmitting tubes from all first infrared transmitting tubes arranged along the first direction further comprises:
determining, according to the remainder, an initial first infrared transmitting tube, wherein an arranging order of the initial first infrared transmitting tube in all first infrared transmitting tubes is same as the remainder; and
determining the plurality of first infrared transmitting tubes each having a distance of N times the preset interval number from the initial first infrared transmitting tube, so as to obtain the plurality of first scanning infrared transmitting tubes, wherein N is a positive integer.

3. The method according to claim 1, wherein the determining, according to the preset interval number and the remainder, the plurality of second scanning infrared transmitting tubes from all second infrared transmitting tubes arranged along the second direction further comprises:
determining, according to the remainder, an initial second infrared transmitting tube, wherein an arranging order of the initial second infrared transmitting tube in all second infrared transmitting tubes is same as the remainder; and
determining the plurality of second infrared transmitting tubes each having a distance of N times the preset interval number from the initial second infrared transmitting tube, so as to obtain the plurality of second scanning infrared transmitting tubes, wherein N is a positive integer.

4. The method according to claim 1, wherein the determining, according to the scanning data corresponding to the plurality of scanning infrared transmitting tubes in the scanning frame, the position of the touch point further comprises:
obtaining, according to scanning data of the plurality of first scanning infrared transmitting tubes, first scanning data;
obtaining, according to scanning data of the plurality of second scanning infrared transmitting tubes, second scanning data; and
determining, according to the first scanning data and the second scanning data, the position of the touch point.

5. The method according to claim 1, wherein the determining, according to the scanning data corresponding to the plurality of scanning infrared transmitting tubes in the scanning frame, the position of the touch point further comprises:
determining, according to the scanning data, whether there is a blocking between the groups of infrared receiving tubes and the scanning infrared transmitting tubes;
in response to detecting that there is a blocking between the groups of infrared receiving tubes and the scanning infrared transmitting tubes, determining a plurality of blocking lines according to a physical connection line between each group of infrared receiving tubes and each scanning infrared transmitting tube where there is a blocking;
determining, according to the plurality of blocking lines, a collection of blocking lines; and
determining, according to the collection of blocking lines, the position of the touch point.

6. The method according to claim 5, wherein the determining, according to the scanning data, whether there is the blocking between the groups of infrared receiving tubes and the scanning infrared transmitting tubes further comprises:
converting the scanning data into signal strength data;
comparing the signal strength data with a preset signal strength threshold so as to determine whether the signal strength data is less than the preset signal strength threshold; and
in response to detecting that the signal strength data is less than the preset signal strength threshold, determining that there is a blocking between the groups of infrared receiving tubes and the scanning infrared transmitting tubes corresponding to the signal strength data.

7. An electronic device comprising a memory, a processor, and a computer program stored on the memory and executable on the processor, wherein the computer program, when executed by the processor, implements steps of the method comprising:
determining, according to a scanning frame of a plurality of scanning frames, a plurality of scanning infrared transmitting tubes, wherein a part of all infrared transmitting tubes arranged on a touch screen are selected as the plurality of scanning infrared transmitting tubes to transmit;
controlling, in the scanning frame, a target scanning infrared transmitting tube of the plurality of scanning infrared transmitting tubes to transmit an infrared signal, and controlling multiple groups of corresponding infrared receiving tubes to receive the infrared signal in sequence so as to obtain scanning data corresponding to the target scanning infrared transmitting tube;
updating the target scanning infrared transmitting tube to be any one of scanning infrared transmitting tubes of the plurality of scanning infrared transmitting tubes that have not been used for scanning, to repeatedly perform the step of controlling, in the scanning frame, the target scanning infrared transmitting tube to transmit an infrared signal until obtaining scanning data corresponding to the plurality of scanning infrared transmitting tubes in the scanning frame; and
determining, according to the scanning data corresponding to the plurality of scanning infrared transmitting tubes in the scanning frame, the position of the touch point,
wherein the plurality of scanning infrared transmitting tubes comprise first scanning infrared transmitting tubes arranged along a first direction;

the determining, according to the scanning frame, the plurality of scanning infrared transmitting tubes further comprises:
  determining, according to a preset interval number and a remainder of a frame order of the scanning frame divided by the preset interval number, a plurality of first scanning infrared transmitting tubes from all first infrared transmitting tubes arranged along the first direction;
  wherein the plurality of scanning infrared transmitting tubes further comprise second scanning infrared transmitting tubes arranged along a second direction; and
  the method further comprises:
  determining, according to the preset interval number and the remainder, a plurality of second scanning infrared transmitting tubes from all second infrared transmitting tubes arranged along the second direction; and
  determining, according to the first scanning infrared transmitting tubes and the second scanning infrared transmitting tubes, the plurality of scanning infrared transmitting tubes.

8. The electronic device according to claim 7, wherein the determining, according to the preset interval number and the remainder, the plurality of first scanning infrared transmitting tubes from all first infrared transmitting tubes arranged along the first direction further comprises:
  determining, according to the remainder, an initial first infrared transmitting tube, wherein an arranging order of the initial first infrared transmitting tube in all first infrared transmitting tubes is same as the remainder; and
  determining the plurality of first infrared transmitting tubes each having a distance of N times the preset interval number from the initial first infrared transmitting tube, so as to obtain the plurality of first scanning infrared transmitting tubes, wherein N is a positive integer.

9. The electronic device according to claim 7, wherein the determining, according to the preset interval number and the remainder, the plurality of second scanning infrared transmitting tubes from all second infrared transmitting tubes arranged along the second direction further comprises:
  determining, according to the remainder, an initial second infrared transmitting tube, wherein an arranging order of the initial second infrared transmitting tube in all second infrared transmitting tubes is same as the remainder; and
  determining the plurality of second infrared transmitting tubes each having a distance of N times the preset interval number from the initial second infrared transmitting tube, so as to obtain the plurality of second scanning infrared transmitting tubes, wherein N is a positive integer.

10. The electronic device according to claim 7, wherein the determining, according to the scanning data corresponding to the plurality of scanning infrared transmitting tubes in the scanning frame, the position of the touch point further comprises:
  obtaining, according to scanning data of the plurality of first scanning infrared transmitting tubes, first scanning data;
  obtaining, according to scanning data of the plurality of second scanning infrared transmitting tubes, second scanning data; and
  determining, according to the first scanning data and the second scanning data, the position of the touch point.

11. The electronic device according to claim 7, wherein the determining, according to the scanning data corresponding to the plurality of scanning infrared transmitting tubes in the scanning frame, the position of the touch point further comprises:
  determining, according to the scanning data, whether there is a blocking between the groups of infrared receiving tubes and the scanning infrared transmitting tubes;
  in response to detecting that there is a blocking between the groups of infrared receiving tubes and the scanning infrared transmitting tubes, determining a plurality of blocking lines according to a physical connection line between each group of infrared receiving tubes and each scanning infrared transmitting tube where there is a blocking;
  determining, according to the plurality of blocking lines, a collection of blocking lines; and
  determining, according to the collection of blocking lines, the position of the touch point.

12. The electronic device according to claim 11, wherein the determining, according to the scanning data, whether there is the blocking between the groups of infrared receiving tubes and the scanning infrared transmitting tubes further comprises:
  converting the scanning data into signal strength data;
  comparing the signal strength data with a preset signal strength threshold so as to determine whether the signal strength data is less than the preset signal strength threshold; and
  in response to detecting that the signal strength data is less than the preset signal strength threshold, determining that there is a blocking between the groups of infrared receiving tubes and the scanning infrared transmitting tubes corresponding to the signal strength data.

13. A non-transitory computer-readable storage medium having computer program instructions stored thereon that, when executed by a processor, implement steps of the method comprising:
  determining, according to a scanning frame of a plurality of scanning frames, a plurality of scanning infrared transmitting tubes, wherein a part of all infrared transmitting tubes arranged on a touch screen are selected as the plurality of scanning infrared transmitting tubes to transmit;
  controlling, in the scanning frame, a target scanning infrared transmitting tube of the plurality of scanning infrared transmitting tubes to transmit an infrared signal, and controlling multiple groups of corresponding infrared receiving tubes to receive the infrared signal in sequence so as to obtain scanning data corresponding to the target scanning infrared transmitting tube;
  updating the target scanning infrared transmitting tube to be any one of scanning infrared transmitting tubes of the plurality of scanning infrared transmitting tubes that have not been used for scanning, to repeatedly perform the step of controlling, in the scanning frame, the target scanning infrared transmitting tube to transmit an infrared signal until obtaining scanning data corresponding to the plurality of scanning infrared transmitting tubes in the scanning frame; and
  determining, according to the scanning data corresponding to the plurality of scanning infrared transmitting tubes in the scanning frame, the position of the touch point,
  wherein the plurality of scanning infrared transmitting tubes comprise first scanning infrared transmitting tubes arranged along a first direction;

the determining, according to the scanning frame, the
  plurality of scanning infrared transmitting tubes further
  comprises:
determining, according to a preset interval number and a
  remainder of a frame order of the scanning frame
  divided by the preset interval number, a plurality of first
  scanning infrared transmitting tubes from all first infrared transmitting tubes arranged along the first direction;
wherein the plurality of scanning infrared transmitting
  tubes further comprise second scanning infrared transmitting tubes arranged along a second direction; and
the method further comprises:
determining, according to the preset interval number and
  the remainder, a plurality of second scanning infrared
  transmitting tubes from all second infrared transmitting
  tubes arranged along the second direction; and
determining, according to the first scanning infrared transmitting tubes and the second scanning infrared transmitting tubes, the plurality of scanning infrared transmitting tubes.

* * * * *